United States Patent
Peterson et al.

(10) Patent No.: US 10,780,611 B2
(45) Date of Patent: Sep. 22, 2020

(54) METHOD FOR CO-CURING PERPENDICULAR STIFFENERS

(71) Applicant: The Boeing Company, Chicago, IL (US)

(72) Inventors: Kristofer L. Peterson, Charleston, SC (US); Eileen E. Miller, Summerville, SC (US); Mark Allen Ulvin, Brier, WA (US); Ronald Leroy McGhee, Lynnwood, WA (US); David A. Lilienthal, Summerville, SC (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/010,905

(22) Filed: Jun. 18, 2018

(65) Prior Publication Data
US 2019/0381700 A1 Dec. 19, 2019

(51) Int. Cl.
*B29C 35/02* (2006.01)
*B29C 70/54* (2006.01)
(Continued)

(52) U.S. Cl.
CPC ............ *B29C 35/02* (2013.01); *B29C 70/543* (2013.01); *B32B 3/085* (2013.01); *B32B 7/08* (2013.01);
(Continued)

(58) Field of Classification Search
CPC ......... B29C 35/02; B29C 70/30; B29C 70/34; B29C 70/543; B64C 1/068; B64C 1/12; B32B 2605/18
See application file for complete search history.

(56) References Cited

U.S. PATENT DOCUMENTS 5,242,523 A * 9/1993 Willden .................. B29C 70/44
156/285
2008/0111024 A1* 5/2008 Lee ........................ B64C 1/068
244/121

(Continued)

FOREIGN PATENT DOCUMENTS

| CN | 105965917 A | 9/2016 |
| FR | 2952581 A1 | 5/2011 |
| WO | WO2012156525 A1 | 11/2012 |

OTHER PUBLICATIONS

European Patent Office Extended Search Report, dated Oct. 24, 2019, regarding Application No. 19171122.5, 9 pages.

(Continued)

*Primary Examiner* — John L Goff, II
(74) *Attorney, Agent, or Firm* — Yee & Associates, P.C.

(57) ABSTRACT

A method for fabricating a composite structure is provided. A first number of layers of composite material is laid up to form a first set of stiffeners. A second number of layers of composite material is laid up to form a panel. The first set of stiffeners is associated with a first side of the panel. A pre-cured composite strip is positioned on a second side of the panel, opposite the first side. A third number of layers of composite material is laid up on the second side of the panel to form a second set of stiffeners running perpendicular to the first set of stiffeners. The pre-cured composite lies at an intersection between one of the first set of stiffeners and one of the second set of stiffeners. All the layers of composite material are co-cured to form the composite structure.

20 Claims, 10 Drawing Sheets

(51) Int. Cl.
*B32B 3/08* (2006.01)
*B32B 7/08* (2019.01)
*B32B 7/12* (2006.01)
*B32B 27/08* (2006.01)
*B29C 70/30* (2006.01)
*B29L 31/30* (2006.01)

(52) U.S. Cl.
CPC ............... *B32B 7/12* (2013.01); *B32B 27/08* (2013.01); *B29C 70/30* (2013.01); *B29L 2031/3076* (2013.01); *B32B 2250/03* (2013.01); *B32B 2605/18* (2013.01)

(56) References Cited

U.S. PATENT DOCUMENTS

| | | | |
|---|---|---|---|
| 2009/0277269 A1* | 11/2009 | Sarr ....................... | G01N 29/07 73/620 |
| 2010/0080942 A1* | 4/2010 | McCarville .......... | B29C 70/086 428/34.1 |
| 2013/0233973 A1 | 9/2013 | Nordman et al. | |
| 2014/0099477 A1* | 4/2014 | Matsen .................. | B29C 70/34 428/166 |

OTHER PUBLICATIONS

Description of Composite Structures, Aug. 10, 2013 (Aug. 10, 2013), XP055229684, 58 pages. Retrieved from the Internet on Nov. 19, 2015. https://web.archive.org/web/20130810060449/http://www.faa.gov/regulations policies/handbooks manuals/aircraft/amtaTrframehandbook/media/ama Ch07.pdf.

\* cited by examiner

METHOD FOR CO-CURING PERPENDICULAR STIFFENERS

BACKGROUND INFORMATION

1. Field

The present disclosure relates generally to manufacturing processes for composite structures. More specifically, the present disclosure relates to a method for co-curing perpendicular stiffeners used in aircraft applications.

2. Background

Manufacturing an aircraft requires many complex processes. With the increasing use of composite structures for aircraft applications, manufacturers continue to look for ways to decrease the cost and time necessary to manufacture these composite parts.

Some aircraft parts are made up of multiple composite structures. For example, a bulkhead may be made up of a composite panel and a set of stiffeners on one or both sides. The stiffeners provide structural support for the panel. The number of composite structures used to form the aircraft part, as well as the orientation and thickness of the composite material, may present unique challenges for a manufacturer.

To form an aircraft part made of multiple composite structures, each component may be individually cured and then fastened together. Other processes co-cure two of the structures and then fasten them to a third part. In still other instances, parts are co-bonded with other parts to form the completed structure. As a result, the part and its components may undergo multiple cure cycles before it is ready to be installed in the aircraft. This process may take more time or be more expensive than desired.

Therefore, it would be desirable to have a method and apparatus that takes into account at least some of the issues discussed above, as well as other possible issues.

SUMMARY

An illustrative embodiment of the present disclosure provides a method for fabricating a composite structure. A first number of layers of composite material are laid up to form a first set of stiffeners. A second number of layers of composite material are laid up to form a panel. The first set of stiffeners is associated with a first side of the panel. A third number of layers of composite material are laid up on a second side of the panel, opposite the first side, to form a second set of stiffeners. The second set of stiffeners runs perpendicular to the first set of stiffeners. The first number of layers of composite material, the second number of layers of composite material, and the third number of layers of composite material are co-cured to form the composite structure.

Another illustrative embodiment of the present disclosure provides a composite structure for an aircraft comprising a panel, a first set of stiffeners, a second set of stiffeners, and a number of pre-cured composite strips. The panel has a first side and a second side opposite the first side. The first set of stiffeners is associated with the first side of the panel. The second set of stiffeners is associated with the second side of the panel. The second set of stiffeners runs perpendicular to the first set of stiffeners. Each of the number of pre-cured composite strips is positioned at an intersection between one of the first set of stiffeners and one of the second set of stiffeners. The panel, the first set of stiffeners, and the second set of stiffeners are co-cured to form the composite structure.

Yet another illustrative embodiment of the present disclosure provides a method for fabricating a composite structure for an aircraft. A first number of layers of composite material is laid up to form a first stiffener. A second number of layers of composite material is laid up to form a panel. The first stiffener is associated with a first side of the panel. A first pre-cured composite strip is positioned on a second side of the panel, opposite the first side. A third number of layers of composite material is laid up on the second side of the panel opposite the first side to form a second stiffener. The second stiffener runs perpendicular to the first stiffener. The first pre-cured composite strip is positioned between the second side of the panel and the second stiffener at an intersection between the first stiffener and the second stiffener. The first number of layers of composite material, the second number of layers of composite material, and the third number of layers of composite material are co-cured to form the composite structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
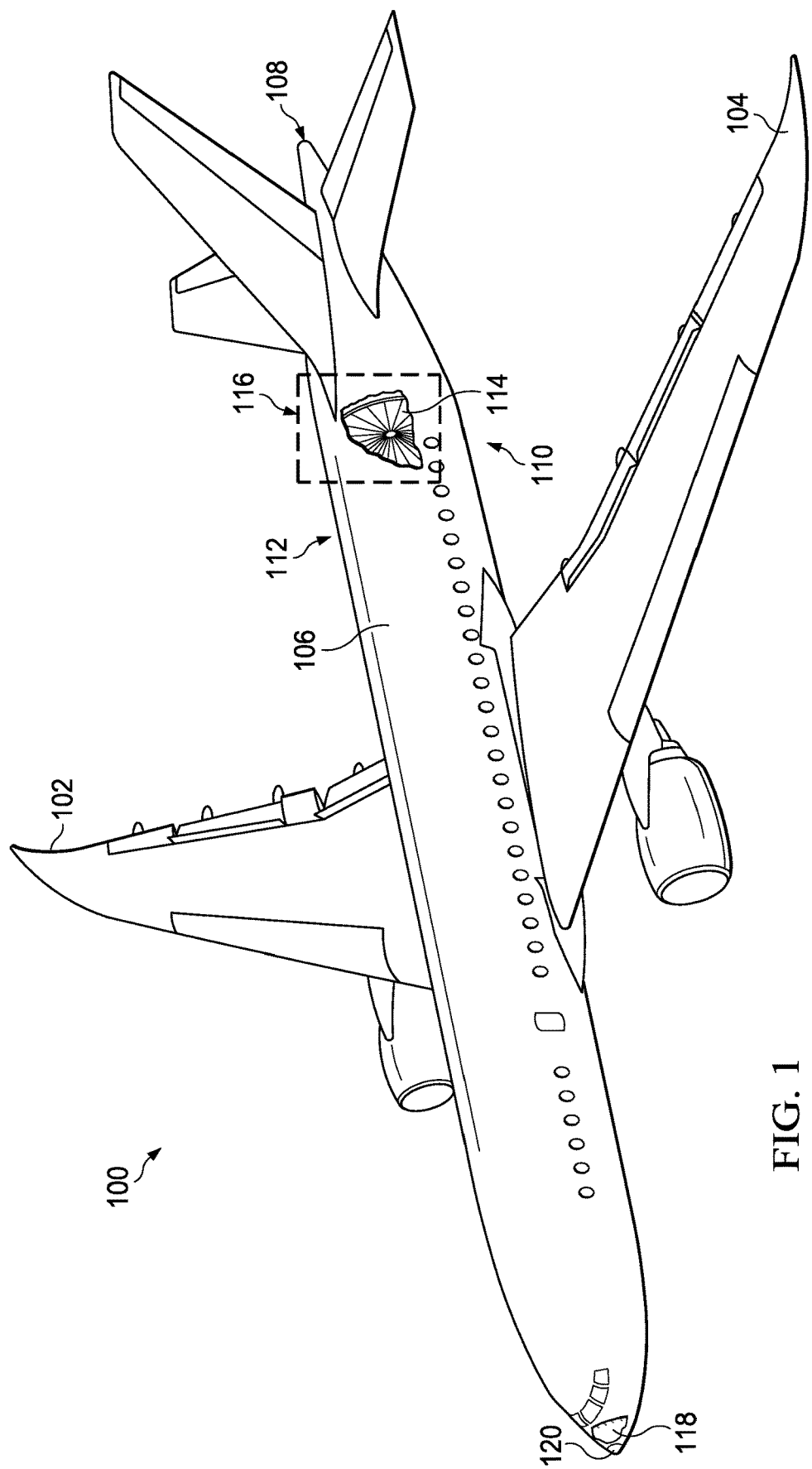
FIG. 1 is an illustration of a perspective view of an aircraft in accordance with an illustrative embodiment.

The illustrative embodiments recognize and take into account one or more different considerations. For example, the illustrative embodiments recognize and take into account that the manufacturing process for an aircraft includes fabricating composite structures for use in that aircraft. Some of these composite structures may be complex. For instance, a bulkhead may be comprised of a composite panel and one set of stiffeners on each side. Stiffeners on one side run perpendicularly to stiffeners on the other. In such a case, some currently used techniques require each part to be laid up and cured individually and then fastened together. This process uses multiple autoclave cycles, countless fasteners, and may take more time and resources than desired.

The illustrative embodiments also recognize and take into account that some currently employed solutions result in a composite part that may not be formed as desired. As an example, when a panel and stiffeners are co-cured, evidence of bowing, delamination, and other undesired effects may be present at the area of overlap. Heavy stiffeners may sink at the intersection. In other words, the stiffeners may not form smoothly, evenly, and in a planar (flat) manner across one side of the panel. The lack of structure, as well as tooling constraints, may limit a manufacturers ability to co-cure composite parts with perpendicular stiffeners.

The illustrative embodiments further recognize and take into account that inspection of composite parts is desired before placing that composite part in an aircraft. For example, non-destructive inspection may be used to find surface and sub-surface defects within a composite part. In areas where overlap of other structures exists, non-destructive inspection may be difficult or unworkable.

Thus, the disclosed embodiments relate to method for co-curing perpendicular stiffeners to a common web. A first number of layers of composite material is laid up on a tool to form a panel. A first pre-cured composite strip is positioned on a first side of the panel. A second number of layers of composite material is laid up on the first side of the panel to form a first stiffener. The pre-cured strip sits between the panel and the first stiffener. A third number of layers of composite material is laid up on a second side of the panel, opposite the first side, to form a second stiffener running perpendicular to the first stiffener.

A number of different tools may be used to maintain the shape of stiffeners on either side of the panel. The first number of layers of composite material, the second number of layers of composite material, and the third number of layers of composite material are co-cured to form the composite structure. The pre-cured strip is co-bonded with the layers of composite material and provides additional structural support while curing. After cure, trim, and inspection, arrestment fasteners are installed at each stiffener intersections, an area that is difficult to inspect (i.e., the no-inspect zone). The disclosed method minimizes the number of cure cycles required to manufacture complex composite panels.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106.

Fuselage 106 has section 108 and section 110. Skin 112 of fuselage 106 is comprised of a composite material. Aft bulkhead 114 separates section 108 from section 110 in portion 116 of fuselage 106. Forward pressure bulkhead 118 is located in nose 120 of aircraft 100.

Both aft bulkhead 114 and forward pressure bulkhead 118 may be made of composite material. Further, these structures may comprise a panel with stiffeners on each side of the panel, such stiffeners running perpendicular to one another. Aft bulkhead 114 and forward pressure bulkhead 118 may be formed using the process described herein.

Figure 2:
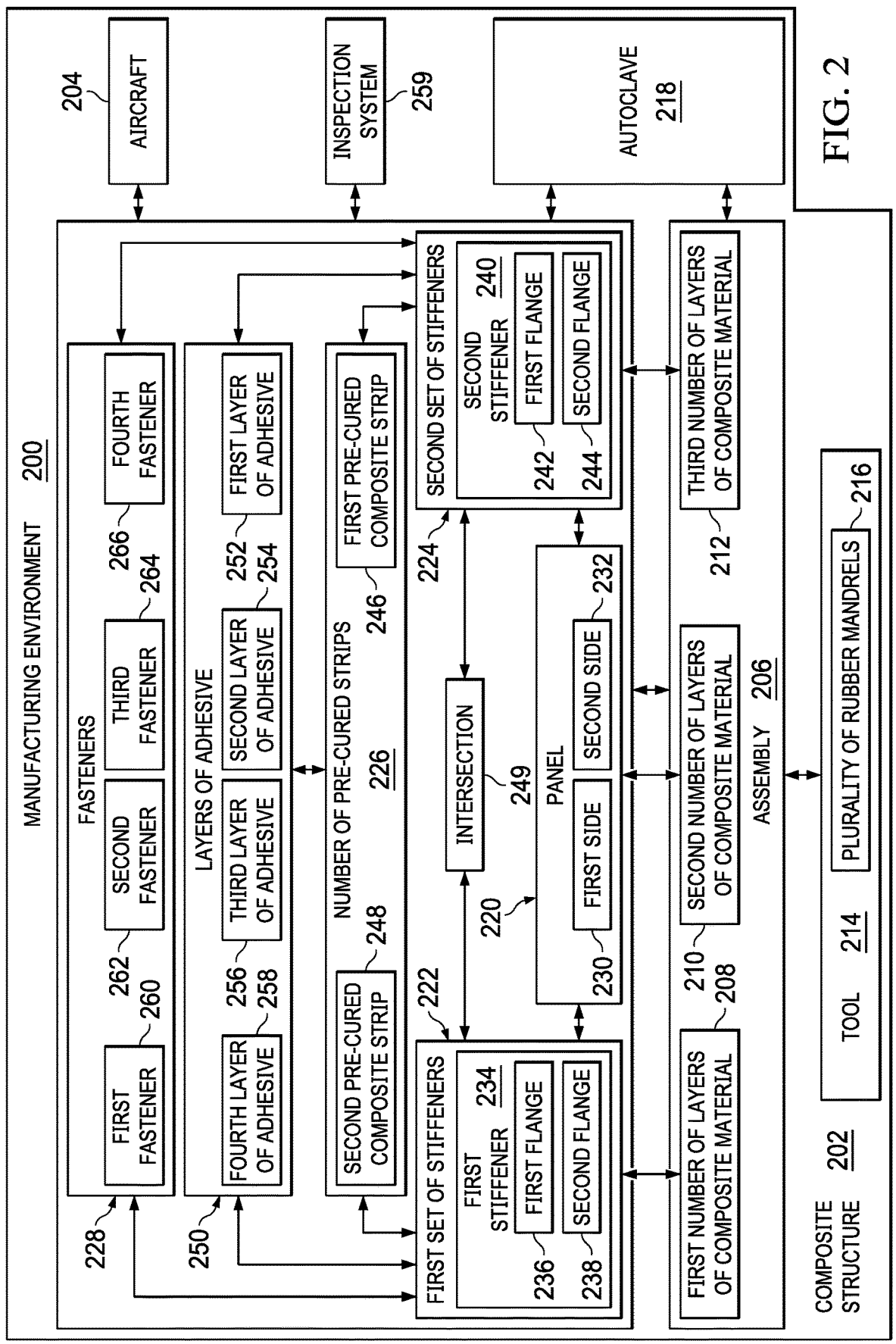
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In this illustrative example, manufacturing environment 200 is an example of an environment where composite structure 202 may be manufactured for use in aircraft 204. Composite structure 202 may then be installed in aircraft 204.

As depicted, composite structure 202 may take a number of different forms. For example, without limitation, composite structure 202 may be a bulkhead, a panel, a compartment, a stabilizer, a wheel well, a divider, a skin, or some other suitable structure for use in aircraft 204. When composite structure 202 is a bulkhead, composite structure 202 may take the form of an aft wheel well bulkhead, an aft nose wheel well bulkhead, a pivot bulkhead, an aft section bulkhead, a forward pressure bulkhead, or some other type of bulkhead.

Prior to curing, composite structure 202 takes the form of assembly 206. Assembly 206 is a stackup of layers of composite material laid up on various tools and support structures. Assembly 206 comprises first number of layers of composite material 208, second number of layers of composite material 210, and third number of layers of composite material 212. Each layer of composite material may be the same or a different type of composite material, depending on the particular implementation.

As used herein, "a number of," when used with reference to items, means one or more items. Thus, a number of layers of composite material includes one or more layers of composite material.

Assembly 206 is supported by tool 214 and plurality of rubber mandrels 216. Plurality of rubber mandrels 216 are placed in each channel of each stiffener. Plurality of rubber mandrels 216 is used to maintain the shape of the stiffeners in assembly 206. After stackup, assembly 206 is bagged, placed under vacuum, and positioned within autoclave 218 for curing.

In this illustrative example, cured composite structure 202 is comprised of panel 220, first set of stiffeners 222, second set of stiffeners 224, number of pre-cured strips 226, and fasteners 228. First number of layers of composite material 208, second number of layers of composite material 210, and third number of layers of composite material 212 were laid up to form first set of stiffeners 222, panel 220, and second set of stiffeners 224, respectively.

Panel 220 provides the web of composite structure 202. Panel 220 may be substantially planar in these illustrative examples.

First set of stiffeners 222 and second set of stiffeners 224 are structures configured to provide structural support for panel 220. First set of stiffeners 222 is associated with first side 230 of panel 220. First side 230 of panel 220 may correspond with the tool side of assembly 206 pre-cure.

Second set of stiffeners 224 is associated with second side 232 of panel 220. Second side 232 of panel 220 may correspond with the bag side of assembly 206 pre-cure. Second set of stiffeners 224 runs perpendicular to first set of stiffeners 222.

Each stiffener in first set of stiffeners 222 and second set of stiffeners 224 may have the same or different shape. For example, without limitation, any one of the stiffeners may take the form of a hat stiffener, a blade stiffener, a round stiffener, a j-stiffener, a trapezoidal stiffener, a half-round stiffener, a rectangular stiffener, a round stiffener, and any other suitable type of stiffener. In this illustrative example first set of stiffeners 222 have a similar shape as second set of stiffeners 224.

As depicted, first stiffener 234 is one of first set of stiffeners 222. First stiffener 234 has first flange 236 and second flange 238, which each run along the length of first stiffener 234, in parallel and opposite one another. Second stiffener 240 is one of second set of stiffeners 224. Second stiffener 240 has first flange 242 and second flange 244, which run along the length of second stiffener 240, in parallel and opposite one another.

In this illustrative example, number of pre-cured strips 226 are composite structures previously cured and trimmed. The composite material selected for number of pre-cured strips 226 may be selected from any type of composite material suitable for use in assembly 206. The type and thickness of number of pre-cured strips 226 may vary depending on the particular implementation.

Number of pre-cured strips 226 are configured for placement in assembly 206 to provide a desired level of stiffness at certain areas of composite structure 202. Number of pre-cured strips 226 promote flatness of the different layers of the part during curing.

As depicted, number of pre-cured strips 226 lay between second set of stiffeners 224 and second side 232 of panel 220. Number of pre-cured strips 226 may also lay between first set of stiffeners 222 and first side 230 of panel 220. In other words, number of pre-cured composite strips are sandwiched between two uncured parts in assembly 206 and are co-bonded with those parts during the autoclave cycle.

Number of pre-cured strips 226 may not be needed on both sides of panel 220 to maintain the desired shape and stiffness for panel 220 and stiffeners (222, 224) during cure. However, number of pre-cured strips 226 are needed on at least one side of panel 220.

As illustrated, first pre-cured composite strip 246 lays between second stiffener 240 and second side 232 of panel 220. Second pre-cured composite strip 248 lays between first stiffener 234 and first side 230 of panel 220. First pre-cured composite strip 246 and second pre-cured composite strip 248 provide stiffness for assembly 206 during curing and prevent buckling of assembly 206 at intersection 249 of first stiffener 234 and second stiffener 240. Intersection 249 is the geometrical overlap of first stiffener 234 and second stiffener 240 with panel 220 sandwiched in between.

In this illustrative example, first pre-cured composite strip 246 and second pre-cured composite strip 248 may have a shape configured to cover the overlap between perpendicular stiffeners. First pre-cured composite strip 246 and second pre-cured composite strip 248 may run the entire length of second stiffener 240 and first stiffener 234, respectively. In this manner, first pre-cured composite strip 246 provides support at each intersection between second stiffener 240 and every perpendicular stiffener in first set of stiffeners 222 on the other side of panel 220 that geometrically overlaps with second stiffener 240.

In other illustrative examples, first pre-cured composite strip 246 and second pre-cured composite strip 248 may not run the length of second stiffener 240 and first stiffener 234, respectively. Instead, the pre-cured strips may provide stiffness at the intersection points on either side of the panel where first stiffener 234 and second stiffener 240 overlap, only. In other words, a pre-cured strip may be segmented. These segments may have gaps between them or may be positioned adjacent to one another where no space is present.

Any one of number of pre-cured strips 226 may have a square shape, a rectangular shape, and irregular shape, a circular shape, or some other suitable type of shape. Since number of pre-cured strips 226 comprise composite material and are laid up at the same time as the other layers of composite material, the addition of number of pre-cured strips 226 does not substantially increase the weight, complexity, or processing time of composite structure 202.

Layers of adhesive 250 adhere number of pre-cured strips 226 to surrounding structures in assembly 206. In this depicted example, second stiffener 240 and first pre-cured composite strip 246 have first layer of adhesive 252 between the two. First pre-cured composite strip 246 and second side 232 of panel 220 have second layer of adhesive 254 between the two. In a similar fashion, first side 230 of panel 220 and second pre-cured composite strip 248 have third layer of adhesive 256 between the two. Second pre-cured composite strip 248 and first stiffener 234 have fourth layer of adhesive 258 between the two.

Once assembly 206 is cured in autoclave 218 to form cured composite structure 202, composite structure 202 is trimmed and inspected. Inspection system 259 is configured to inspect composite structure 202 for defects. For example, without limitation, inspection system 259 may be a non-destructive inspection system. Inspection of panel 220 at intersection 249 of first stiffener 234 and second stiffener 240 may be unworkable. As a result, fasteners 228 are installed such that structural stability of panel 220 in that area is within selected tolerances. Fasteners 228 may be called arrestment fasteners in this illustrative example.

As depicted, fasteners 228 transect composite structure 202 at various points in the overlap between first stiffener 234 and second stiffener 240. More specifically, first fastener 260 is installed through first flange 242 of second stiffener 240, first layer of adhesive 252, first pre-cured composite strip 246, second layer of adhesive 254, second side 232 of panel 220, first side 230 of panel 220, third layer of adhesive 256, second pre-cured composite strip 248, fourth layer of adhesive 258 and finally first flange 236 of first stiffener 234.

In a similar fashion, second fastener 262 is installed through first flange 242 of second stiffener 240, through the rest of the structure, and to second flange 238 of first stiffener 234. Third fastener 264 transects second flange 244 of second stiffener 240, through the structure, and through first flange 236 of first stiffener 234. Fourth fastener 266 transects second flange 244 of second stiffener 240, then through the structure, and finally through second flange 238 of first stiffener 234.

Collectively, fasteners 228 secure first stiffener 234, panel 220, and second stiffener 240 at intersection 249 such that positive margins are maintained while no non-destructive inspection is performed on the panel where intersecting stringers preclude full coverage. Of course, in other illustrative examples, more or fewer fasteners 228 may be installed at intersection 249. Fasteners 228 are installed at each intersection between a stiffener in first set of stiffeners 222 and its perpendicular counterparts in second set of stiffeners 224.

With the use of an illustrative embodiment, panel 220, first set of stiffeners 222, and second set of stiffeners 224 may be cured in a single autoclave cycle. The use of number of pre-cured strips 226 prevents undesired defects, such as bowing, to occur at the intersection of the stiffeners and panel 220. Panel 220 will remain substantially flat during curing. The use of arrestment fasteners 228 eliminate the need for inspection in the area of overlap.

The illustrative embodiments described herein reduce manufacturing time and decrease cost to form composite structure 202. Since panel 220, first set of stiffeners 222, and second set of stiffeners 224 are all formed at once, the need for drilling and fastening the parts together is substantially reduced. Rework also may be reduced or eliminated.

Figure 3:
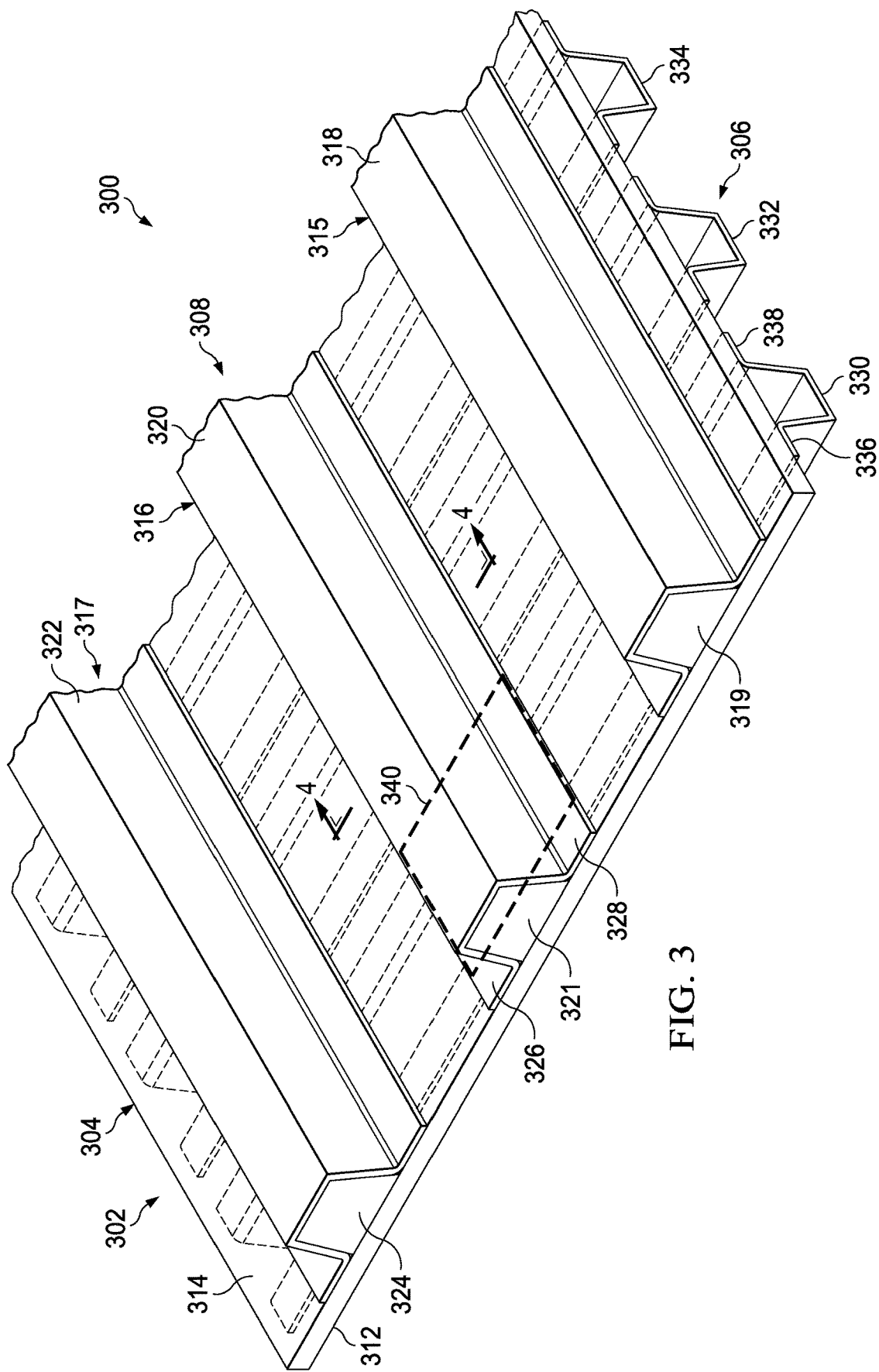
FIG. 3 is an illustration of a perspective view of an assembly used to form a composite structure in accordance with an illustrative embodiment.

With reference next to FIG. 3, an illustration of a perspective view of a manufacturing environment is depicted in accordance with an illustrative embodiment. Manufacturing environment 300 is an example of a physical implementation for manufacturing environment 200 shown in block form in FIG. 2. Components used to form aft bulkhead 114 in portion 116 of aircraft 100 from FIG. 1 are shown.

As depicted, assembly 302 includes layers of composite material laid up to form panel 304, first set of stiffeners 306, and second set of stiffeners 308. In this illustrative example, second set of stiffeners 308 run perpendicular to first set of stiffeners 306. Panel 304 has first side 312 and second side 314.

Second set of stiffeners 308 includes stiffener 315, stiffener 316 and stiffener 317. Stiffener 315 is formed from layers of composite material 318 laid up on mandrel 319. Stiffener 316 is formed from layers of composite material 320 laid up on mandrel 321. Stiffener 317 is formed from layers of composite material 322 laid up on mandrel 324. In this illustrative example, first stiffener 316 has flange 326 and flange 328.

First set of stiffeners 306 include stiffener 330, stiffener 332, and stiffener 334, each formed from layers of composite material. Stiffener 330 has flange 336 and flange 338.

Stiffener 316 on second side 314 of panel 304 intersects with stiffener 330 on first side 312 of panel 304 at section 340. A pre-cured strip (not shown in this view) is positioned between stiffener 316 and second side 314 of panel 304 prior to curing. In a similar fashion, stiffener 317 and stiffener 330 also overlap. A pre-cured strip is also placed at that intersection, as well as any additional areas in which a stiffener on one side overlaps a stiffener on the other.

Figure 4A:
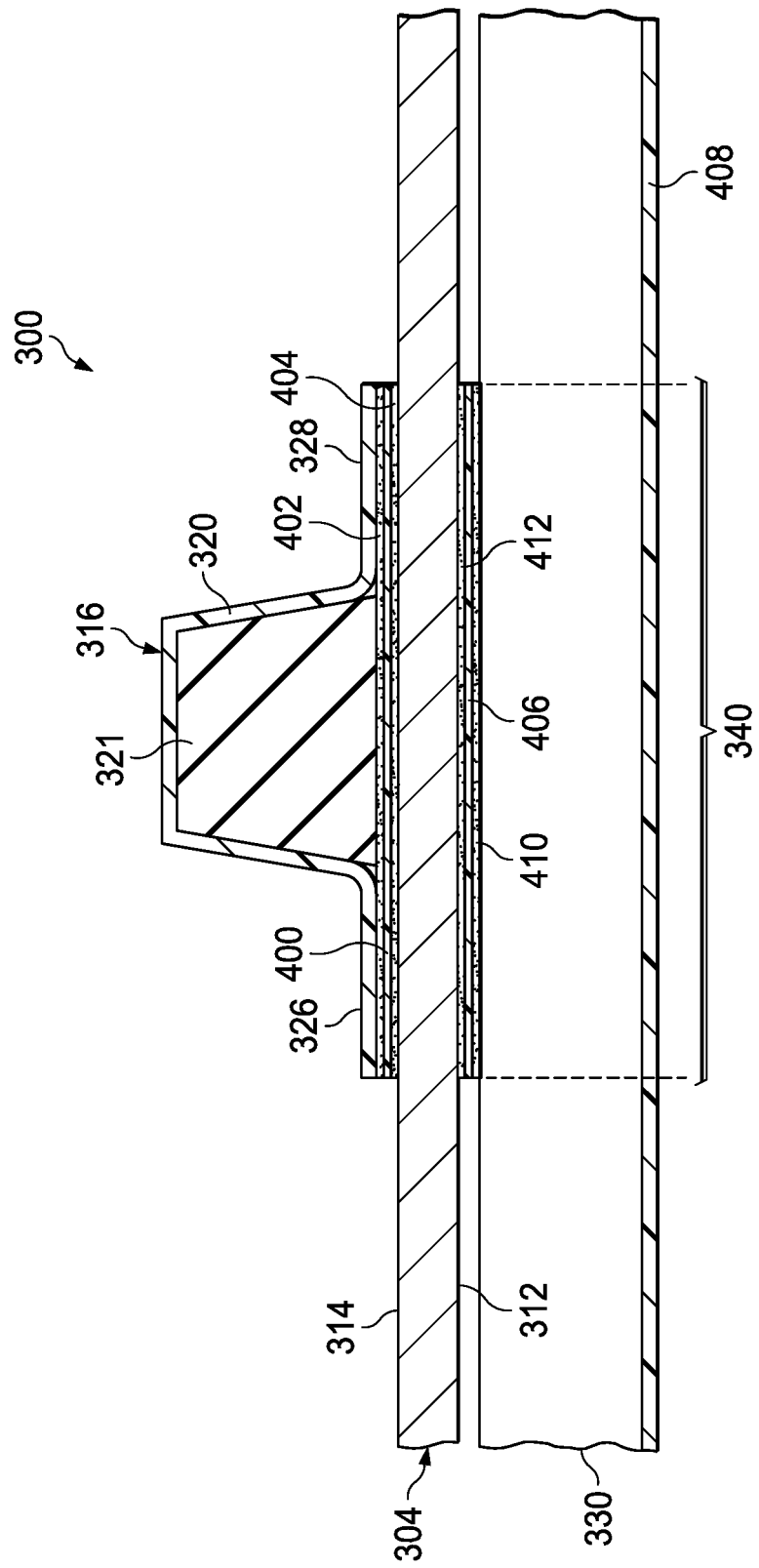
FIG. 4A is an illustration of a cross-sectional view of an assembly used to form a composite structure in accordance with an illustrative embodiment.

Turning now to FIG. 4A, an illustration of a cross-sectional view of an assembly used to form a composite structure is depicted in accordance with an illustrative embodiment. A cross-sectional view of assembly 302 is shown along lines 4-4 in FIG. 3.

Pre-cured composite strip 400 has been positioned between layers of composite material 320 and second side 314 of panel 304 at section 340. Layer of adhesive 402 bonds pre-cured composite strip 400 to layers of composite material 320. In this illustrative example, adhesive 402 the entire surface of pre-cured composite strip 400. In other illustrative examples, adhesive 402 may only cover a portion of pre-cured composite strip 400 at the stiffener flanges. Layer of adhesive 404 bonds pre-cured composite strip 400 to panel 304.

As illustrated, pre-cured composite strip 406 has been positioned between layers of composite material 408 and first side 312 of panel 304 at section 340. Layer of adhesive 410 bonds pre-cured composite strip 406 to layers of composite material 408. Layer of adhesive 412 bonds pre-cured composite strip 406 to panel 304.

Both pre-cured composite strip 400 and pre-cured composite strip 406 are examples of physical implementations for one of number of pre-cured strips 226 shown in block form in FIG. 2.

Figure 4B:
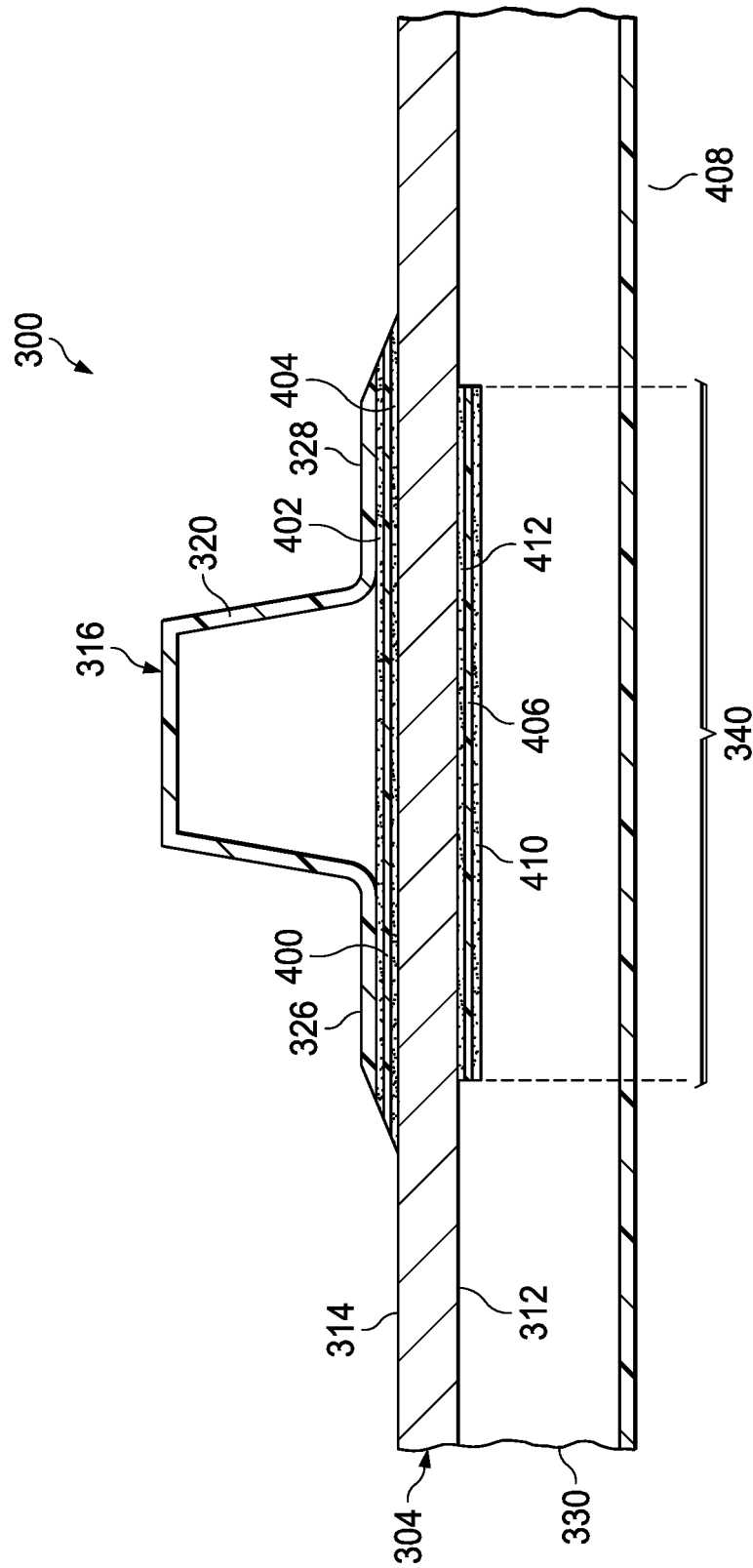
FIG. 4B is an illustration of a cross-sectional view of a formed composite structure in accordance with an illustrative embodiment.

FIG. 4B shows a cross-sectional view of a formed composite structure in accordance with an illustrative embodiment, along lines 4-4 in FIG. 3. Assembly 302 has been cured and mandrel 321 removed. As shown in this view, panel 304 remains substantially planar and the tooling (mandrels) associated with stiffener 330, does not cause sagging at section 340.

Figure 5:
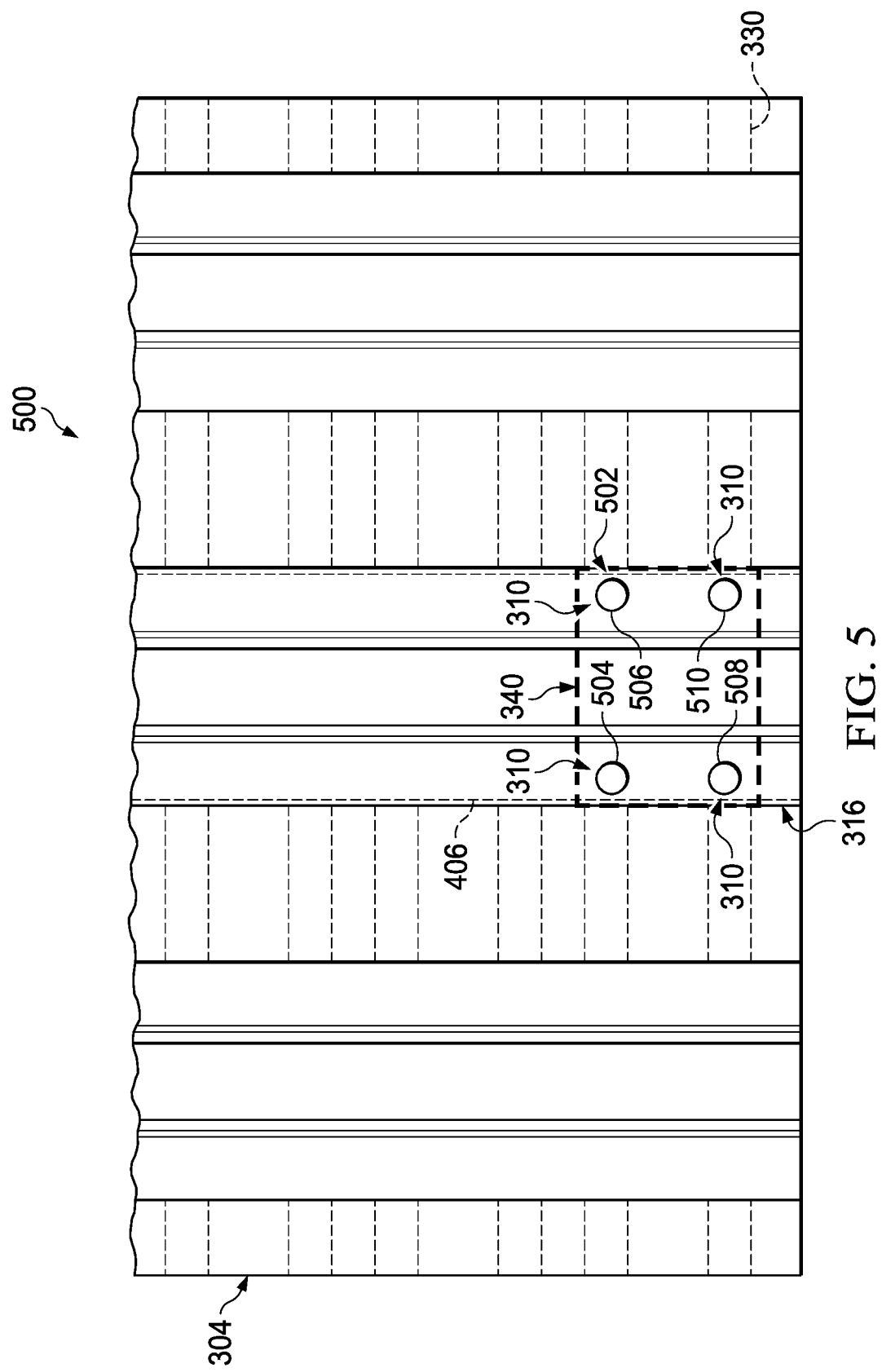
FIG. 5 is an illustration of an overhead view of a composite structure in accordance with an illustrative embodiment.

Turning now to FIG. 5, an illustration of an overhead view of a composite structure is depicted in accordance with an illustrative embodiment. FIG. 5 depicts an overhead view of composite structure 500. Composite structure 500 represents first set of stiffeners 306, second set of stiffeners 308, and panel 304 after curing.

In this illustrative example, section 340 may contain a no-inspection or "no-scan" zone. Fasteners 502 have been placed in section 340 of composite structure 500. Specifically, fastener 504, fastener 506, fastener 508, and fastener 510 have been placed in locations 310 where a flange of stiffener 316 overlaps with a flange of stiffener 330. The installation of arrestment fasteners in these areas provides the desired level of performance notwithstanding the capabilities to inspect.

Although pre-cured strip 406 is shown running the entire length of stiffener 316 in this illustrative example, in other illustrative example, pre-cured strip 406 may be segmented and localized only to the intersections between stiffener 316 and a perpendicular stiffener on the other side of panel 304.

Figure 6:
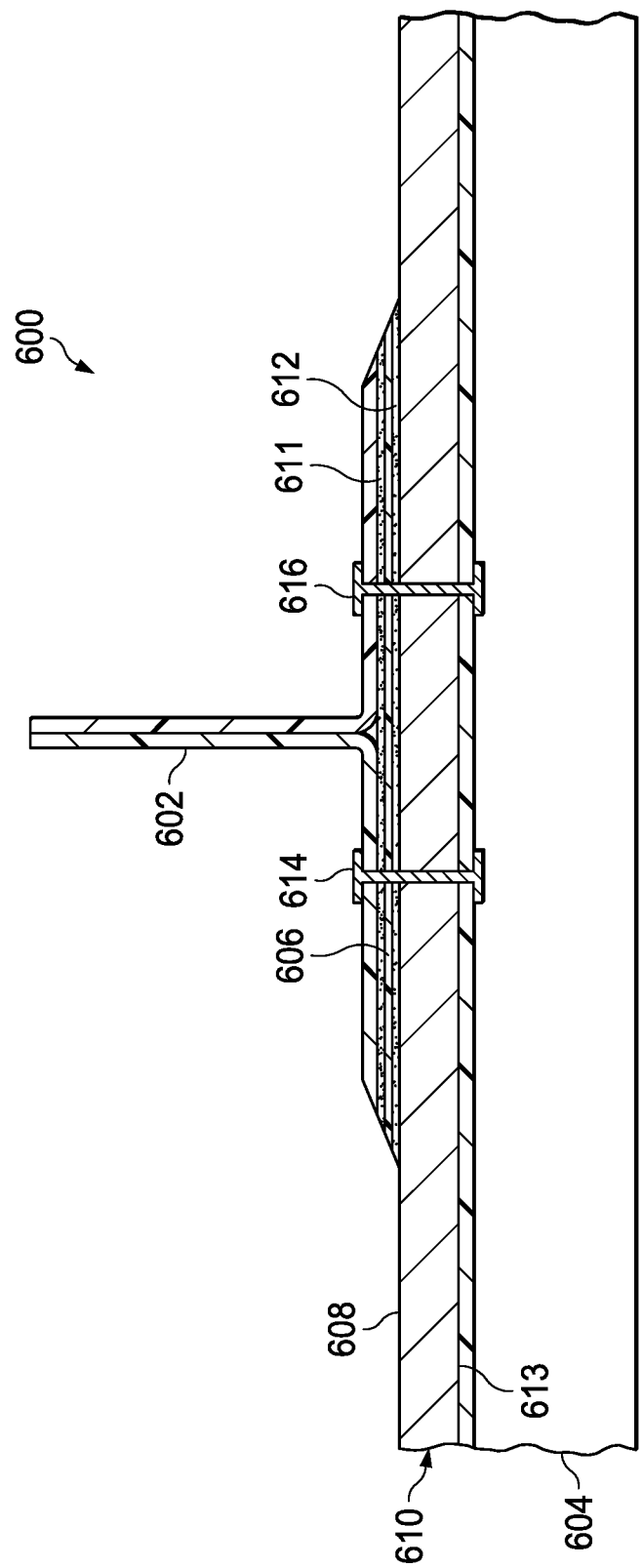
FIG. 6 is an illustration of a cross-sectional view of a composite structure in accordance with an illustrative embodiment.

Turning now to FIG. 6, an illustration of a cross-sectional view of a composite structure is depicted in accordance with an illustrative embodiment. Composite structure 600 is an example of a physical implementation for composite structure 202 shown in block form in FIG. 2. FIG. 6 shows a different configuration for the bag side stiffener.

As illustrated, composite structure 600 includes stiffener 602 and stiffener 604. Stiffener 602 is a blade stiffener in this illustrative example. Stiffener 602 is oriented perpendicularly to stiffener 604. Composite structure 600 is formed similarly to composite structure 500 shown in FIG. 5.

In this illustrative example, only one pre-cured composite strip is used in composite structure 600. Pre-cured composite strip 606 is positioned between stiffener 602 and first side 608 of panel 610. Pre-cured composite strip 606 is surrounded on either side by layer of adhesive 611 and layer of adhesive 612, respectively. Stiffener 604 is co-cured and attached directly to second side 613 of panel 610, instead of having a pre-cured strip between the two structures. Fastener 614 and fastener 616 penetrate the flanges of stiffener 602 to stiffener 604.

Aircraft 100 in FIG. 1 is only one physical implementation of a platform incorporating composite structure 202 in FIG. 2 having number of pre-cured strips 226. Although the examples for an illustrative embodiment are described with respect to an aircraft, an illustrative embodiment may be applied to other types of platforms. Composite structure 202 in FIG. 2 may be used in any platform where a bulkhead or other panel with perpendicular stiffeners is desired. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, or another suitable platform.

The different components shown in FIG. 1 and FIGS. 3-6 may be combined with components in FIG. 2, used with components in FIG. 2, or a combination of the two. Additionally, some of the components in FIG. 1 and FIGS. 3-6 may be illustrative examples of how components shown in block form in FIG. 2 may be implemented as physical structures.

Other configurations of assembly 302 may be implemented other than those shown in FIGS. 3-5. For example, pre-cured composite strip 406 and associated layers of adhesive may be absent. In other illustrative examples, additional pre-cured strips may be used at section 340 on one or both sides of panel 304.

Figure 7:
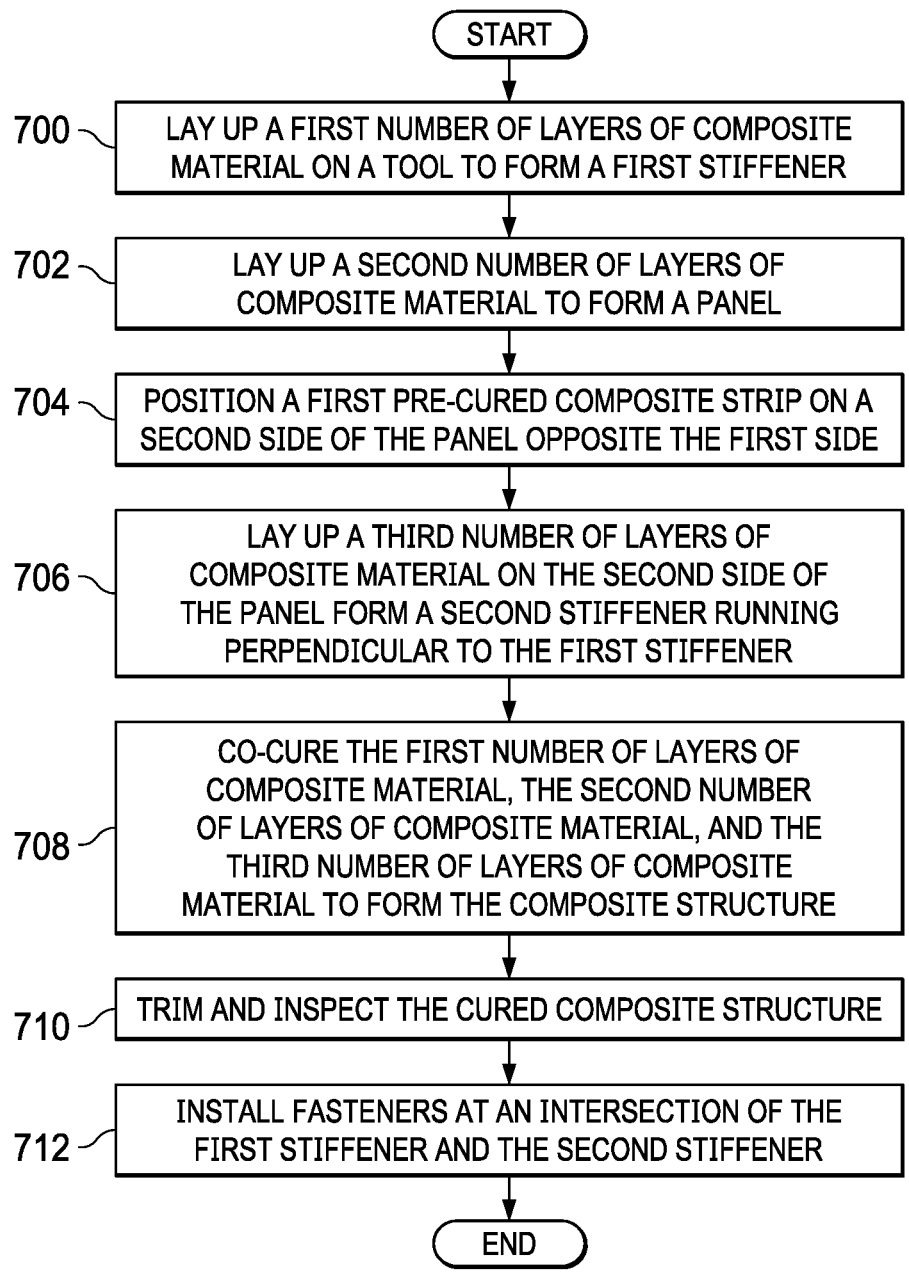
FIG. 7 is an illustration of a flowchart of a process for fabricating a composite structure in accordance with an illustrative embodiment.

Turning next to FIG. 7, an illustration of a flowchart of a process for fabricating a composite structure is depicted in accordance with an illustrative embodiment. The process described in FIG. 7 may be used to form composite structure 202 for aircraft 204 shown in block form in FIG. 2.

The process begins by laying up a first number of layers of composite material on a tool to form a first stiffener (operation 700). Then, a second number of layers of composite material are laid up to form a panel (operation 702). The first stiffener is associated with a first side of the panel. Next, a first pre-cured composite strip is positioned on a second side of the panel opposite the first side (operation 704).

The process then lays up a third number of layers of composite material on the second side of the panel to form a second stiffener running perpendicular to the first stiffener (operation 706). The first pre-cured composite strip has been positioned between the second stiffener and the second side of the panel at an intersection between the first stiffener and the second stiffener.

Thereafter, the process co-cures the first number of layers of composite material, the second number of layers of composite material, and the third number of layers of composite material to form the composite structure (operation 708)

Next, the cured composite structure is trimmed and inspected (operation 710). The process then installs fasteners at an intersection of the first stiffener and the second stiffener (operation 712) with the process terminating thereafter.

In some illustrative examples, the operations described in FIG. 7 may occur in a different order than described herein. Depending on the particular implementation, an operation may be modified or eliminated to allow flexibility and critical off path work.

Figure 8:
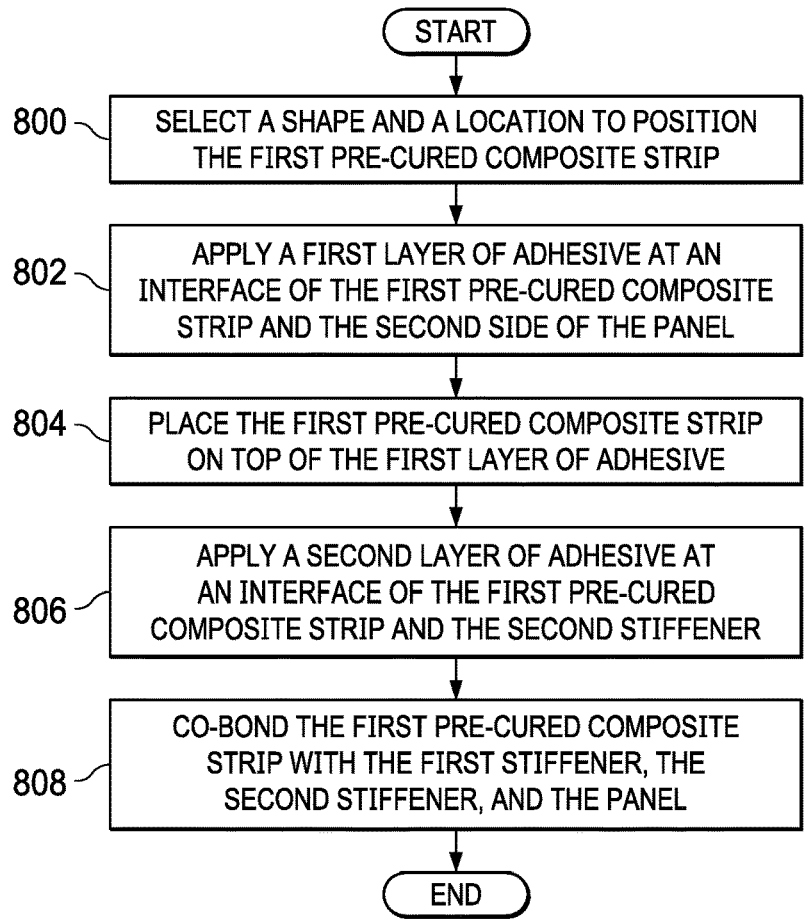
FIG. 8 is an illustration of a flowchart of a process for fabricating a composite structure in accordance with an illustrative embodiment.

Turning now to FIG. 8, an illustration of a flowchart of process for fabricating a composite structure is depicted in accordance with an illustrative embodiment. The process depicted in FIG. 8 may be used to position the first pre-cured composite strip in the assembly, as described in operation 704 in FIG. 7.

The process begins by selecting a shape and location to position the first pre-cured composite strip (operation 800). The process then applies a first layer of adhesive at an interface of the first pre-cured composite strip and the second side of the panel (operation 802). Next, the first pre-cured composite strip is placed on top of the first layer of adhesive (operation 804).

The process then applies a second layer of adhesive at an interface of the first pre-cured composite strip and the second stiffener (operation 806). Operation 804 and operation 806 may occur in reverse order in some applications.

The process next co-bonds the first pre-cured composite strip with the first stiffener, the second stiffener, and the panel (operation 808) with the process terminating thereafter. This process may be repeated for each stiffener to ensure even curing and reduce deformations at the overlap between a stiffener on one side of the panel and the corresponding stiffener running parallel on the opposite side of the panel. Additional layers of adhesive may be used. A second pre-cured composite strip may be positioned on the second side of the panel at the intersection of the first stiffener and the second stiffener. The process for positioning and co-bonding remains the same.

Figure 9:
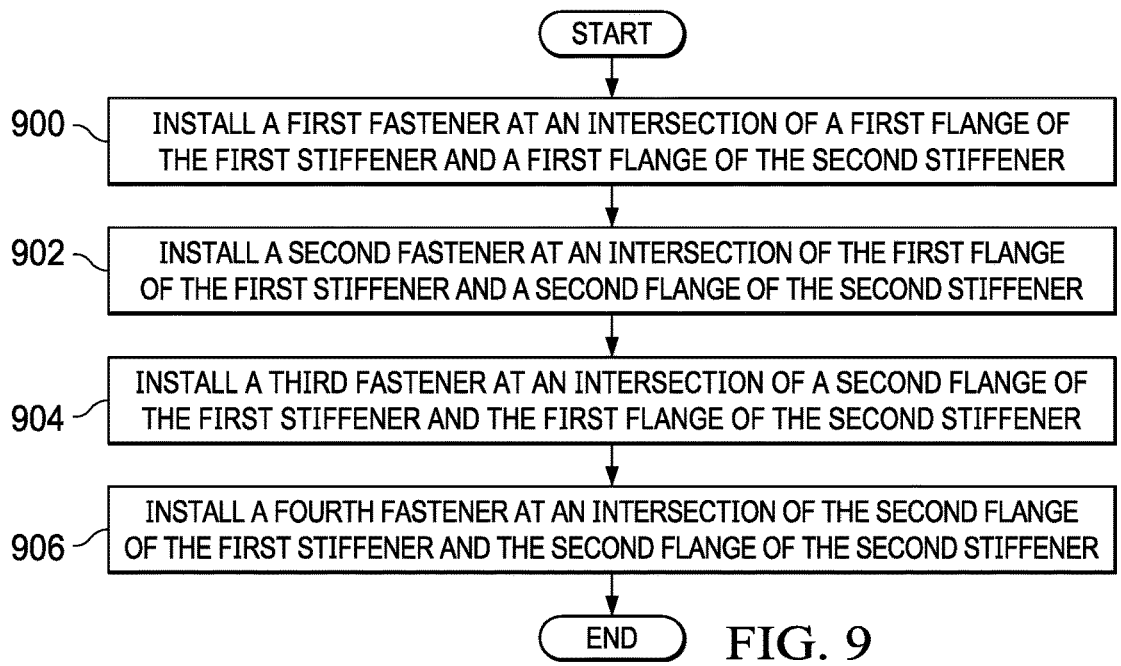
FIG. 9 an illustration of a flowchart of a process for installing arrestment fasteners for a composite structure in accordance with an illustrative embodiment.

Turning now to FIG. 9, an illustration of a flowchart of a process for installing arrestment fasteners for a composite structure is depicted in accordance with an illustrative embodiment. The process depicted in FIG. 9 may be used during operation 712 shown in FIG. 7. The addition of arrestment fasteners ensures a desired degree of structural stability in hard to inspect areas of the assembly.

The process begins by installing a first fastener at an intersection of a first flange of the first stiffener and a first flange of the second stiffener (operation 900). Next, a second fastener is installed at an intersection of the first flange of the first stiffener and a second flange of the second stiffener (operation 902).

The process then installs a third fastener at an intersection of a second flange of the first stiffener and the first flange of the second stiffener (operation 904). Then, a fourth fastener is installed at an intersection of the second flange of the first stiffener and the second flange of the second stiffener (906) with the process terminating thereafter.

This process may be repeated for each stiffener to ensure structural stability at the overlap between a stiffener on one side of the panel and the corresponding stiffener running perpendicular on the opposite side of the panel.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 10:
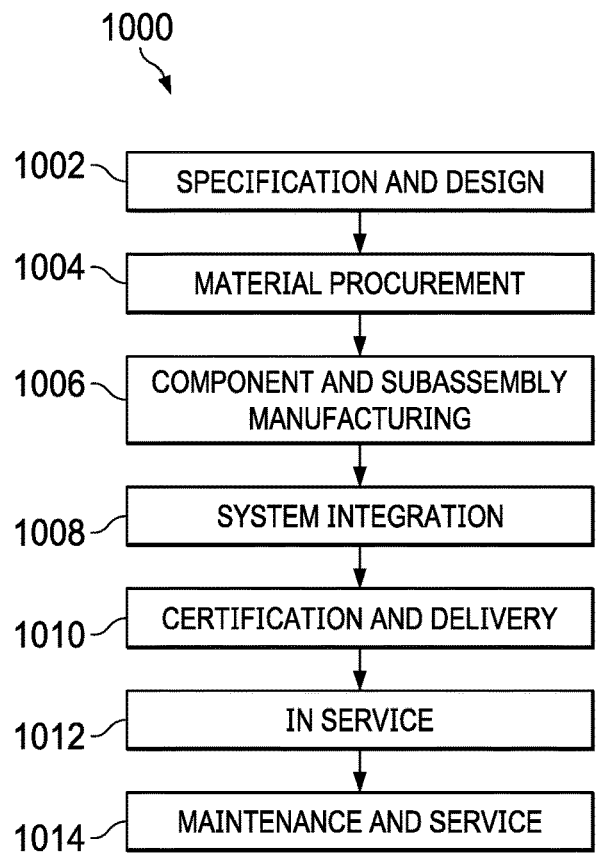
FIG. 10 is an illustration of a block diagram of an aircraft manufacturing and service method in accordance with an illustrative embodiment.
Figure 11:
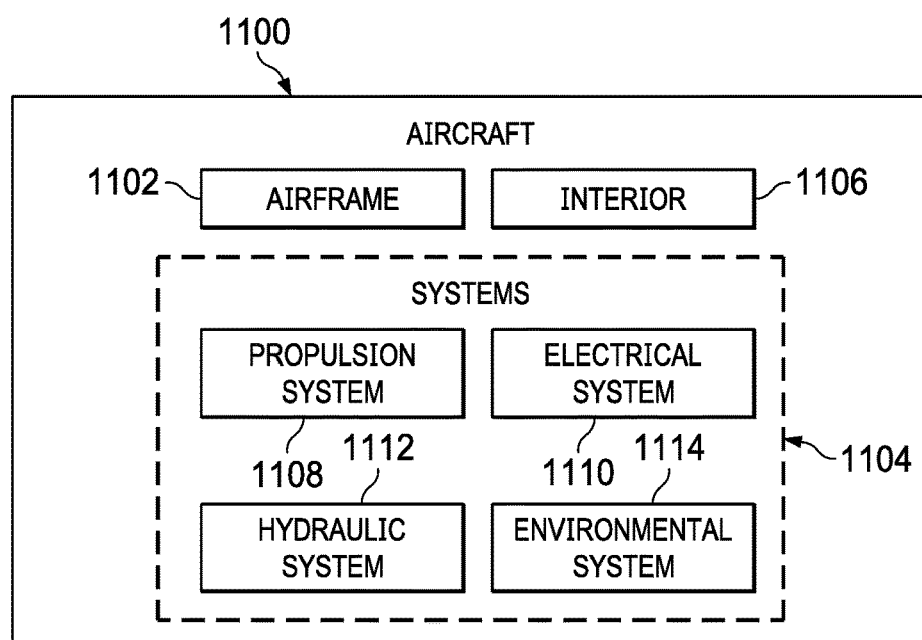
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 to be placed in service 1012. While in service 1012 by a customer, aircraft 1100 in FIG. 11 is scheduled for routine maintenance and service 1014, which may include modification, reconfiguration, refurbishment, and other maintenance or service.

Composite structure 202 from FIG. 2 and the components within composite structure 202 may be made during component and subassembly manufacturing 1006. In addition, composite structure 202 may be used in parts made for routine maintenance and service 1014 as part of a modification, reconfiguration, or refurbishment of aircraft 1100 in FIG. 11.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

The illustrative embodiments provide a method for co-curing perpendicular stiffeners and a panel to form a composite structure for use in aircraft. With the use of pre-cured strips at the overlap between a stiffener on one side of the panel and a stiffener on the other, manufacturers can attain the desired level of stability, ensure structural integrity at the overlap, and decrease manufacturing time of complex composite parts. Stiffeners no longer need to be fastened to the web of the composite structure. As a result, the use of some manufacturing process may be reduced or eliminated, saving both time and money for the manufacturer while more quickly producing a composite part that meets standards for use in aircraft.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a composite structure, the method comprising:
   laying up a first number of layers of composite material to form a first set of stiffeners;
   laying up a second number of layers of composite material to form a panel, wherein the first set of stiffeners is associated with a first side of the panel;
   laying up a third number of layers of composite material on a second side of the panel opposite the first side to form a second set of stiffeners, wherein the second set of stiffeners runs perpendicular to the first set of stiffeners; and
   positioning a first pre-cured composite strip between a first stiffener in the second set of stiffeners and the second side of the panel only at an intersection of the first stiffener in the second set of stiffeners and a second stiffener in the first set of stiffeners;
   co-curing the first number of layers of composite material, the second number of layers of composite material, and the third number of layers of composite material to form the composite structure, wherein the first pre-cured composite strip prevents buckling of the composite structure at the intersection, wherein the intersection is the geometrical overlap of the first stiffener and the second stiffener with the panel sandwiched in between.

2. The method of claim 1 further comprising:
   co-bonding the first pre-cured composite strip with the first number of layers of composite material, the second number of layers of composite material, and the third number of layers of composite material.

3. The method of claim 2 further comprising:
   applying a first layer of adhesive between the first pre-cured composite strip and the second side of the panel prior to co-bonding.

4. The method of claim 3 further comprising:
   applying a second layer of adhesive between the first pre-cured composite strip and the first stiffener prior to co-bonding.

5. The method of claim 2 further comprising:
   installing fasteners at the intersection of the first stiffener in the second set of stiffeners and the second stiffener in the first set of stiffeners after co-curing, wherein the fasteners provide structural support at the intersection.

6. The method of claim 5, wherein installing the fasteners comprises:
   installing a first fastener at an intersection of a first flange of the first stiffener and a first flange of the second stiffener;

installing a second fastener at an intersection of the first flange of the first stiffener and a second flange of the second stiffener;
installing a third fastener at an intersection of a second flange of the first stiffener and the first flange of the second stiffener; and
installing a fourth fastener at an intersection of the second flange of the first stiffener and the second flange of the second stiffener.

7. The method of claim 6 further comprising:
inspecting a cured composite structure.

8. The method of claim 2 further comprising:
positioning a second pre-cured composite strip between the second stiffener in the first set of stiffeners and the first side of the panel; and
co-bonding the second pre-cured composite strip with the first number of layers of composite material, the second number of layers of composite material, and the third number of layers of composite material.

9. The method of claim 8 further comprising:
applying a third layer of adhesive between the second pre-cured composite strip and the first side of the panel prior to co-bonding; and
applying a fourth layer of adhesive between the second pre-cured composite strip and the second stiffener prior to co-bonding.

10. The method of claim 2 further comprising:
positioning a plurality of rubber mandrels in a channel of each stiffener of the second set of stiffeners to maintain a desired shape during curing.

11. A method for fabricating a composite structure for an aircraft, the method comprising:
laying up a first number of layers of composite material to form a first stiffener;
laying up a second number of layers of composite material to form a panel, wherein the first stiffener is associated with a first side of the panel;
positioning a first pre-cured composite strip on a second side of the panel, wherein the second side is opposite the first side;
laying up a third number of layers of composite material on the second side of the panel to form a second stiffener running perpendicular to the first stiffener, wherein the first pre-cured composite strip is positioned between the second stiffener and the second side of the panel only at an intersection of the first stiffener and the second stiffener; and
co-curing the first number of layers of composite material, the second number of layers of composite material, and the third number of layers of composite material to form the composite structure, wherein the first pre-cured composite strip prevents buckling of the composite structure at the intersection, wherein the intersection is the geometrical overlap of the first stiffener and the second stiffener with the panel sandwiched in between.

12. The method of claim 11 further comprising:
applying a first layer of adhesive between the first pre-cured composite strip and the second side of the panel;
applying a second layer of adhesive between the first pre-cured composite strip and the second stiffener; and
co-bonding the first pre-cured composite strip with the first number of layers of composite material, the second number of layers of composite material, and the third number of layers of composite material.

13. The method of claim 12 further comprising:
positioning a second pre-cured composite strip between the first stiffener and the first side of the panel;
applying a third layer of adhesive at an interface of the second pre-cured composite strip and the first side of the panel; and
applying a fourth layer of adhesive at the interface of the second pre-cured composite strip and the first stiffener; and
co-bonding the second pre-cured composite strip with the first number of layers of composite material, the second number of layers of composite material, and the third number of layers of composite material.

14. The method of claim 11 further comprising:
installing fasteners at the intersection of the first stiffener and the second stiffener after co-curing.

15. The method of claim 11 further comprising:
co-bonding the first pre-cured composite strip with the first number of layers of composite material, the second number of layers of composite material, and the third number of layers of composite material.

16. The method of claim 15 further comprising:
applying a first layer of adhesive between the first pre-cured composite strip and the second side of the panel prior to co-bonding.

17. The method of claim 16 further comprising: applying a second layer of adhesive between the first pre-cured composite strip and the second stiffener prior to co-bonding.

18. The method of claim 14, wherein installing fasteners comprises:
installing a first fastener at an intersection of a first flange of the first stiffener and a first flange of the second stiffener;
installing a second fastener at an intersection of the first flange of the first stiffener and a second flange of the second stiffener;
installing a third fastener at an intersection of a second flange of the first stiffener and the first flange of the second stiffener; and
installing a fourth fastener at an intersection of the second flange of the first stiffener and the second flange of the second stiffener.

19. The method of claim 18 further comprising:
inspecting a cured composite structure.

20. The method of claim 15 further comprising: positioning a plurality of rubber mandrels in a channel of the second stiffener to maintain a desired shape during curing.

* * * * *